US012091911B2

(12) United States Patent
Thumerel et al.

(10) Patent No.: US 12,091,911 B2
(45) Date of Patent: Sep. 17, 2024

(54) ELECTROMECHANICAL ACTUATOR AND BLACKOUT DEVICE COMPRISING SUCH AN ACTUATOR

(71) Applicant: SOMFY ACTIVITES SA, Cluses (FR)

(72) Inventors: Stéphane Thumerel, La Roche sur Foron (FR); Mickaël Mugnier, Bonneville (FR); Vincent Pelle, Neuville-sur-Saone (FR); Ghislain Measson, Marignier (FR)

(73) Assignee: SOMFY ACTIVITES SA, Cluses (FR)

( * ) Notice: Subject to any disclaimer, the term of this patent is extended or adjusted under 35 U.S.C. 154(b) by 555 days.

(21) Appl. No.: 17/293,829

(22) PCT Filed: Nov. 15, 2019

(86) PCT No.: PCT/EP2019/081464

§ 371 (c)(1),
(2) Date: May 13, 2021

(87) PCT Pub. No.: WO2020/099628

PCT Pub. Date: May 22, 2020

(65) Prior Publication Data

US 2022/0018185 A1 Jan. 20, 2022

(30) Foreign Application Priority Data

Nov. 16, 2018 (FR) ....................................... 1860615

(51) Int. Cl.
*E06B 9/322* (2006.01)
*E06B 9/308* (2006.01)
(Continued)

(52) U.S. Cl.
CPC .............. *E06B 9/322* (2013.01); *E06B 9/308* (2013.01); *E06B 9/323* (2013.01); *H01H 3/122* (2013.01)

(58) Field of Classification Search
CPC .......... E06B 9/322; E06B 9/308; E06B 9/323; H01H 3/122; H01H 3/12; H01H 13/14;
(Continued)

(56) References Cited

U.S. PATENT DOCUMENTS 9,012,797 B2 * 4/2015 Otani .................. B60Q 1/1476 200/520
10,809,680 B2 * 10/2020 Abraham ................ E06B 9/322

FOREIGN PATENT DOCUMENTS

DE 10 2010 023 932 3/2011
EP 2 530 235 12/2012
(Continued)

OTHER PUBLICATIONS

International Search Report for PCT/EP2019/081464 dated Jan. 15, 2020, 5 pages.
(Continued)

*Primary Examiner* — Lheiren Mae A Caroc
(74) *Attorney, Agent, or Firm* — NIXON & VANDERHYE

(57) ABSTRACT

An electromechanical actuator includes a housing, an electronic control unit and a switching device. The switching device includes a first member which is attached to a wall of the housing by removable attachment elements and arranged opposite an opening of the wall, and a second member which is movable relative to the first member. The electronic control unit includes a switch and a printed circuit board. The switch is actuated by the second member through the opening provided in the wall and is assembled on the printed circuit board. The printed circuit board includes an electrical connection device arranged opposite the opening of the wall. Moreover, the electrical connection device is accessible
(Continued)

through the opening, after the first and second members are withdrawn from the wall, by removing the removable attachment elements.

20 Claims, 6 Drawing Sheets

(51) Int. Cl.
*E06B 9/323* (2006.01)
*H01H 3/12* (2006.01)

(58) Field of Classification Search
CPC .. H01H 13/50; H01H 13/52; H01H 2221/066; H01H 2221/028; H01H 2221/044; H01H 2221/056; H01H 2233/05; H01H 2223/054; H01H 2223/07; H01H 2223/074
See application file for complete search history.

(56) References Cited

FOREIGN PATENT DOCUMENTS

| | | |
|---|---|---|
| FR | 2 977 907 | 1/2013 |
| FR | 3 057 293 | 4/2018 |

OTHER PUBLICATIONS

Written Opinion of the ISA for PCT/EP2019/081464 dated Jan. 15, 2020, 7 pages.
French Search Report for 1860615 dated Jul. 9, 2019, 2 pages.

* cited by examiner

ELECTROMECHANICAL ACTUATOR AND BLACKOUT DEVICE COMPRISING SUCH AN ACTUATOR

CROSS-REFERENCE TO RELATED APPLICATIONS

This application is the U.S. national phase of International Application No. PCT/EP2019/081464 filed Nov. 15, 2019 which designated the U.S. and claims priority to FR 1860615 filed Nov. 16, 2018, the entire contents of each of which are hereby incorporated by reference.

BACKGROUND OF THE INVENTION

Field of the Invention

The present invention relates to an electromechanical actuator. The present invention relates also to a covering device comprising a rail and a screen. The screen is moved by such an electromechanical actuator arranged inside the rail.

In general, the present invention relates to the field of covering devices comprising a motorized drive device moving a screen, between at least a first position and at least a second position.

Description of the Related Art

A motorized drive unit comprises an electromechanical actuator of a movable sun protection or closing element, such as a blind with slats or any other equivalent material, subsequently called a screen.

Document FR 3 057 293 A1 is already known, which describes an electromechanical actuator for a blind with slats. The electromechanical actuator comprises a casing, an electric motor, an electronic control unit and a switching device.

The switching device is used to detect an upper position of a screen of the blind. The upper position corresponds to the bearing of a first slat of the screen against a part of the switching device.

The switching device comprises a housing, a first member and a second member. The housing comprises a wall. The wall of the housing comprises an opening. The first member is attached on the wall of the housing by means of removable attachment elements and is arranged opposite to the opening of the wall of the housing, in an assembled configuration of the electromechanical actuator. The second member is movable relative to the first member, in the assembled configuration of the electromechanical actuator. The electronic control unit comprises a switch and a printed circuit board. The switch is activated via the second member of the switching device through the opening of the wall of the housing, depending on a position of the second member relative to the first member, in the assembled configuration of the electromechanical actuator. The switch is assembled on the printed circuit board, in the assembled configuration of the electromechanical actuator.

This electromechanical actuator is generally satisfactory. However, this electromechanical actuator has the disadvantage that it does not present an easily accessible electrical connection device, which would allow resetting or adjusting of at least a part of the operating parameters of the electromechanical actuator, or else which would allow a diagnosis of the electromechanical actuator, based on operating data of the electromechanical actuator.

Furthermore, electromechanical actuators are known for other types of covering devices, such as roller blinds, comprising an electrical connection device, which allows at least a part of the operating parameters of the electromechanical actuator to be reset or adjusted, only accessible by removing a winding tube from the mounting brackets and, eventually, by sliding the electromechanical actuator relative to the winding tube, to remove it from this latter, then by disassembling the electromechanical actuator.

In the case where only the removing of a winding tube relative to the mounting brackets is required, the electrical connection device is located on a torque support, also called head, of the electromechanical actuator. Such a torque support is configured to be attached on one of the mounting brackets, in the assembled configuration of the covering device.

In the case where the removal of the electromechanical actuator relative to the winding tube and the disassembly of the electromechanical actuator are required, the electrical connection device is located inside a casing of the electromechanical actuator and, in particular, at an electronic control unit.

Consequently, a maintenance or repair intervention of an electromechanical actuator is long and complex, therefore expensive, with the risk of damaging elements of either the covering device or the electromechanical actuator.

Document EP 2 530 235 A1 is also known, which describes an electromechanical actuator for an outdoor venetian blind. The electromechanical actuator comprises a first casing, a second casing, an electric motor, an electronic control unit and a switching device. The first casing is designed to accommodate the electric motor. The second casing is designed to accommodate the electronic control unit and comprises a cover to allow the mounting of the switching device. The second casing is mounted directly on a wall of the first casing facing slats of the outdoor venetian blind. Moreover, the electronic control unit comprises a printed circuit board. The switching device is a pressure sensor configured to generate a stop signal for the electromechanical actuator, when a first slat of the outdoor venetian blind activates the switching device.

Document DE 10 2010 023 932 A1 is also known, which describes an electromechanical actuator of a venetian blind. The electromechanical actuator comprises a casing, an electric motor, an electronic control unit and a switching device. The switching device is mounted on a lower wall of the casing of the electromechanical actuator. The switching device is configured to generate a signal to the electronic control unit, via a status line, when a first slat of the venetian blind activates the switching device.

SUMMARY OF THE INVENTION

The object of the present invention is to solve the aforementioned drawbacks and to provide an electromechanical actuator of a covering device, as well as a covering device comprising such an electromechanical actuator, which makes it possible to facilitate access to an electrical connection device, during maintenance or repair intervention on the electromechanical actuator, without having to remove the electromechanical actuator from the covering device, while minimizing the costs of obtaining the electromechanical actuator.

For this purpose, the present invention relates, according to a first aspect, to an electromechanical actuator of a covering device, the electromechanical actuator comprising at least:

a casing, the casing comprising at least a wall, the wall of the casing comprising at least an opening, an electric motor, an electronic control unit, and a switching device, the switching device comprising at least:

a first member, the first member being attached on the wall of the casing by means of removable attachment elements and arranged opposite to the opening of the wall of the casing, in an assembled configuration of the electromechanical actuator, and a second member, the second member being movable relative to the first member, in the assembled configuration of the electromechanical actuator, the electronic control unit comprising at least:

a switch, the switch being activated via the second member of the switching device through the opening of the wall of the casing, depending on a position of the second member relative to the first member, in the assembled configuration of the electromechanical actuator, a printed circuit board, the switch being assembled on the printed circuit board, in the assembled configuration of the electromechanical actuator.

According to the invention, the printed circuit board comprises an electrical connection device arranged opposite to the opening of the wall of the casing, in the assembled configuration of the electromechanical actuator, the electrical connection device being accessible through the opening of the wall of the casing, following a removal of the first and second members from the wall of the casing, by disassembly of the removable attachment elements.

Thus, such a construction of the electromechanical actuator allows easy access to the electrical connection device, during maintenance or repair intervention of the electromechanical actuator, without having to disassembly the electromechanical actuator relative to the covering device.

Moreover, the electromechanical actuator makes it possible, on the one hand, to detect an upper position of a screen of the covering device by means of the switching device and the electronic control unit and, on the other hand, to gain access to the electrical connection device of the printed circuit board through the opening in the casing of the electromechanical actuator, following the disassembly of the first and second members of the switching device from the casing.

In this way, the electromechanical actuator comprises a limited number of components to, on the one hand, allow detection of the upper position of the screen and, on the other hand, allow access to the electrical connection device of the printed circuit board.

Consequently, the costs of obtaining the electromechanical actuator are low. According to an advantageous feature of the invention, the electrical connection device of the printed circuit board is configured to reset or adjust at least a part of the operating parameters of the electromechanical actuator, by means of a terminal, the operating parameters being stored by a memory of the electronic control unit.

According to another advantageous feature of the invention, the electrical connection device of the printed circuit board is configured to enable a diagnosis of the electromechanical actuator, from operating data of the electromechanical actuator, by means of a terminal, the operating data being stored by a memory of the electronic control unit.

According to another advantageous feature of the invention, the electronic control unit comprises a microcontroller. The microcontroller is assembled on the printed circuit board, in the assembled configuration of the electromechanical actuator. Moreover, the microcontroller comprises the memory.

According to another advantageous feature of the invention, the casing of the electromechanical actuator is tubular.

According to another advantageous feature of the invention, the removable attachment elements are elastic snap-on attachment elements.

According to another advantageous feature of the invention, the electrical connection device comprises electrical connection points on a side of the printed circuit board.

According to another advantageous feature of the invention, the electrical connection points are electrical conductors of the printed circuit board.

According to another advantageous feature of the invention, the electrical connection device is configured to be electrically connected to an electrical outlet, following the removal of the switching device from the casing.

According to a second aspect, the present invention relates to a covering device comprising a rail and a screen. The screen is moved by an electromechanical actuator, according to the invention and as mentioned above, arranged inside the rail.

This covering device has characteristics and advantages similar to those described above in relation to the electromechanical actuator according to the invention.

BRIEF DESCRIPTION OF THE DRAWINGS

Other features and advantages of the invention will appear in the following description, made with reference to the appended drawings, given as non-limiting examples.

DESCRIPTION OF THE PREFERRED EMBODIMENTS

Figure 1:
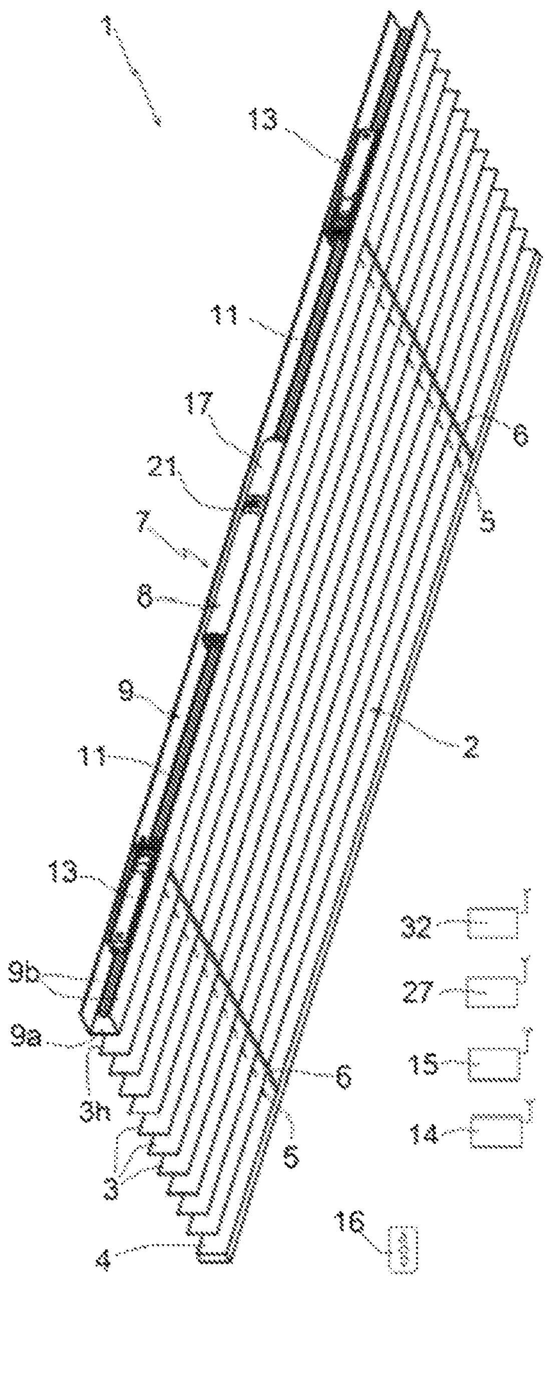
FIG. 1 is a schematic perspective view of a blind with orientable slats according to an embodiment of the invention.
Figure 2:
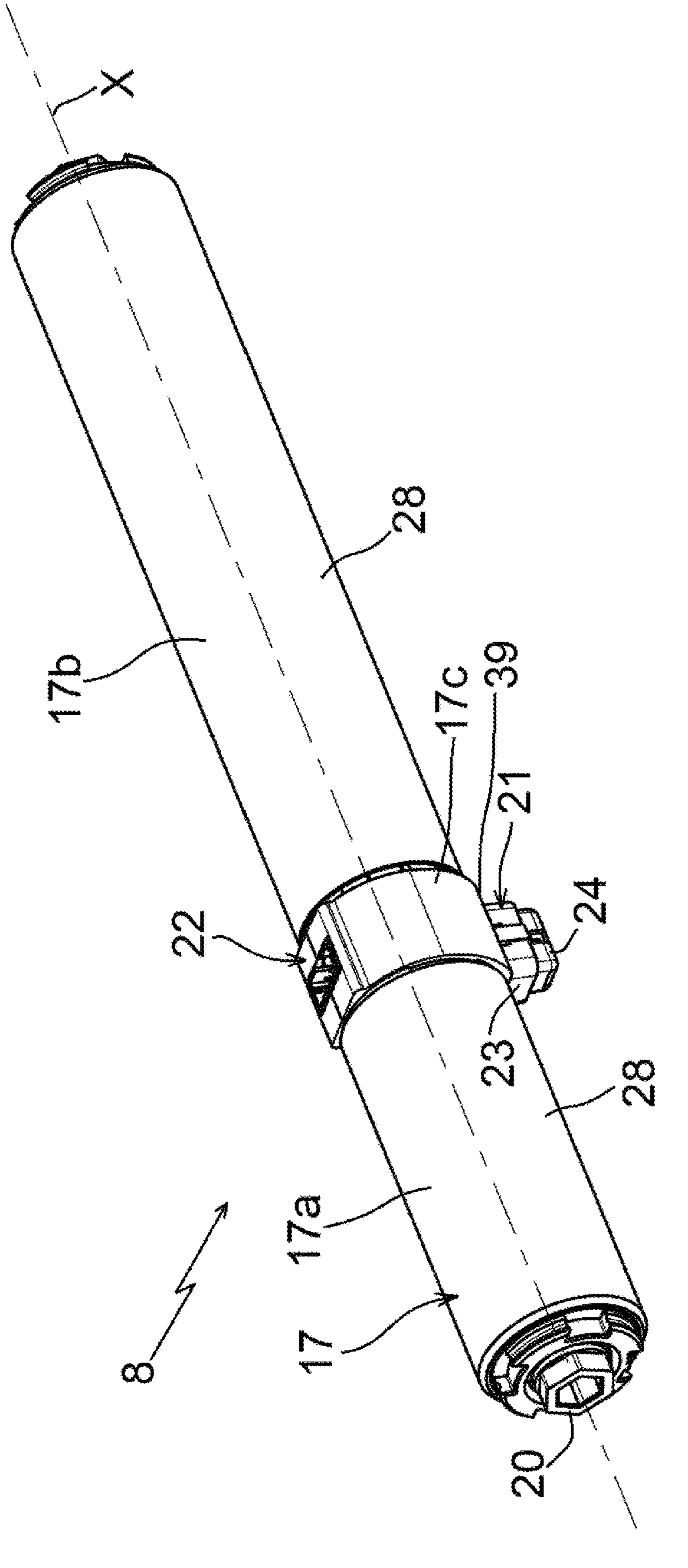
FIG. 2 is a schematic perspective view of an electromechanical actuator of the blind with orientable slats illustrated in FIG. 1.

First of all, with reference to FIG. 1, a home automation installation according to the invention and installed in a building, not shown, comprising an opening, window or door, equipped with a screen 2 belonging to a covering device 1, in particular a motorized blind with slats, is described.

In a variant, the covering device 1 can be, in particular, a pleated blind.

The covering device 1 is, preferably, arranged inside the building. In a variant, the covering device 1 can be arranged outside the building.

With reference to FIG. 1, a blind with orientable slats is described according to an embodiment of the invention.

The blind 1 comprises slats 3, in particular orientable slats. The blind 1 may also comprise a loading bar 4. Here, the screen 2 is formed with the slats 3 and the loading bar 4. The loading bar 4 is used to exert a tension on the screen 2.

In practice, the loading bar 4 is attached to a lower end of the screen 2, in an assembled configuration of the blind 1 in the home automation installation. In a variant, the screen 2 comprises an end slat in place of the loading bar 4, able to be weighted.

The blind 1 comprises drive cords 5 configured to allow vertical movement of the slats 3 and the loading bar 4. The drive cords 5 can also be called tapes.

In practice, the slats 3 respectively comprise an opening, not shown, for the passage of each drive cord 5.

In the exemplary embodiment illustrated in FIG. 1, the blind 1 also comprises orientation cords 6 configured to allow orientation of the slats 3. Th orientation cords 6 are also called ladders.

The orientation of the slats 3 allows, in particular, to adjust the brightness inside a room in the building.

When the screen 2 and, in particular, the loading bar 4 are raised, the slats 3 are superimposed on the loading bar 4, so as to form a stack.

In an exemplary embodiment, not shown, the blind 1 comprises two guides. Each of the guides is arranged along a side of the screen 2 of the blind 1. The guides are configured to cooperate with the slats 3 of the screen 2, so as to guide the slats 3, when the screen 2 is opened and retracted.

In another exemplary embodiment, also not shown, the slats 3 are guided by two cables. Each of the cables is arranged along a side of the screen 2 of the blind 1.

The blind 1 comprises a motorized drive unit 7. The motorized drive unit 7 comprises an electromechanical actuator 8. The electromechanical actuator 8 allows to lower or raise the slats 3 and the loading bar 4, in other words to open or retract the screen 2. The electromechanical actuator 8 also makes it possible to orientate the slats 3.

The blind 1 comprises a rail 9, inside which the motorized drive unit 7 and, in particular, the electromechanical actuator 8 is arranged.

The rail 9 is arranged above the screen 2.

In general, the rail 9 is arranged above the opening of the building, or else in an upper part of the opening of the building.

The rail 9 comprises a back wall 9*a* and two side walls 9*b*.

In the assembly mode illustrated in FIG. 1, the rail 9 presents a U-shaped cross-section.

The motorized drive unit 7 comprises a plurality of winders, not shown. The winders are configured to wind and unwind the drive cords 5, so as to cause the vertical movement of the slats 3 and the loading bar 4.

Here, the motorized drive unit 7 comprises two winders. The number of winders is not limited and can be different, in particular more than two.

The drive cords 5 are connected to the loading bar 4, on the one hand, and to the winders, on the other hand.

In practice, the lower end of each drive cord 5 is connected to the loading bar 4 and the upper end of each drive cord 5 is connected to one of the winders, in the assembled configuration of the blind 1 in the home automation installation.

Preferably, the winders are arranged inside the rail 9.

In an embodiment, the winders are also configured to wind and unwind the orientation cords 6, so that to orientate the slats 3.

Advantageously, the motorized drive unit 7 comprises tilting devices 13, usually called "tilters". The winders are respectively arranged inside a tilting device 13.

Moreover, the tilting devices 13 are arranged inside the rail 9. In the exemplary embodiment illustrated in FIG. 1, the motorized drive unit 7 comprises two tilting devices 13.

The number of tilting devices is not limited and can be different, in particular more than two. In the case where the number of tilting devices is greater than or equal to two, the electromechanical actuator is arranged between two of the tilting devices.

Here, the tilting devices 13 are arranged on either side of the electromechanical actuator 8. Preferably, each tilting device 13 is arranged near a longitudinal end of the rail 9.

Advantageously, the motorized drive unit 7 is controlled by a command unit. The command unit can be, for example, a local command unit 14. The local command unit 14 can be wired or wirelessly connected to a central command unit 15. The central command unit 15 controls the local command unit 14, as well as other similar local command units and distributed throughout the building.

Advantageously, the central command unit 15 can be in communication with a weather station arranged inside the building or remote outside the building, including, in particular, one or more sensors able to be configured to determine, for example, a temperature, a brightness, or else a wind speed, in the case where the weather station is remote outside the building.

A remote control 16, which can be a type of local command unit, is provided with a control keypad. The control keypad comprises selection and display elements, allowing, in addition, a user to intervene on the electromechanical actuator 8 and/or the central command unit 15.

The motorized drive unit 7 is, preferably, configured to carry out the commands for opening or retracting the screen 2 of the blind 1, and for orienting the slats 3, which can be emitted, for example, by the remote control 16.

The electromechanical actuator 8 of the motorized drive unit 7 belonging to the blind 1 in FIG. 1 is now described, in more detail and with reference to FIGS. 2 to 8.

The electromechanical actuator 8 comprises a casing 17, an electric motor 18 and an electronic control unit 19.

The electric motor 18 comprises a rotor and a stator, not shown and positioned coaxially around an axis of rotation X, which is also the axis of rotation of the winders, in a mounted configuration of the motorized drive unit 7.

The electromechanical actuator 8 is supplied with electrical energy from a mains electricity supply network, or else by means of a battery, which can be recharged, for example, by a photovoltaic panel. The electromechanical actuator 8 allows the screen 2 of the blind 1 to be moved, particularly according to a vertical movement, and the slats 3 of screen 2 to be oriented.

Advantageously, the electromechanical actuator 8 comprises an electric power supply cable, not shown, allowing it to be supplied with electrical energy, from the mains electricity supply network or from the battery.

Advantageously, the casing 17 of the electromechanical actuator 8 is tubular. Here, the casingl7 of the electromechanical actuator 8 is cylindrical in shape and, more particularly, has a circular cross-section.

In a variant, not shown, the casing 17 of the electromechanical actuator 8 is of parallelepipedal shape.

Advantageously, the electromechanical actuator 8 also comprises at least a reducing gearbox 12 and at least an output shaft 20.

The reducing gearbox 12 comprises at least one reduction stage. The reduction stage can be an epicyclic type gear train.

Figure 3:
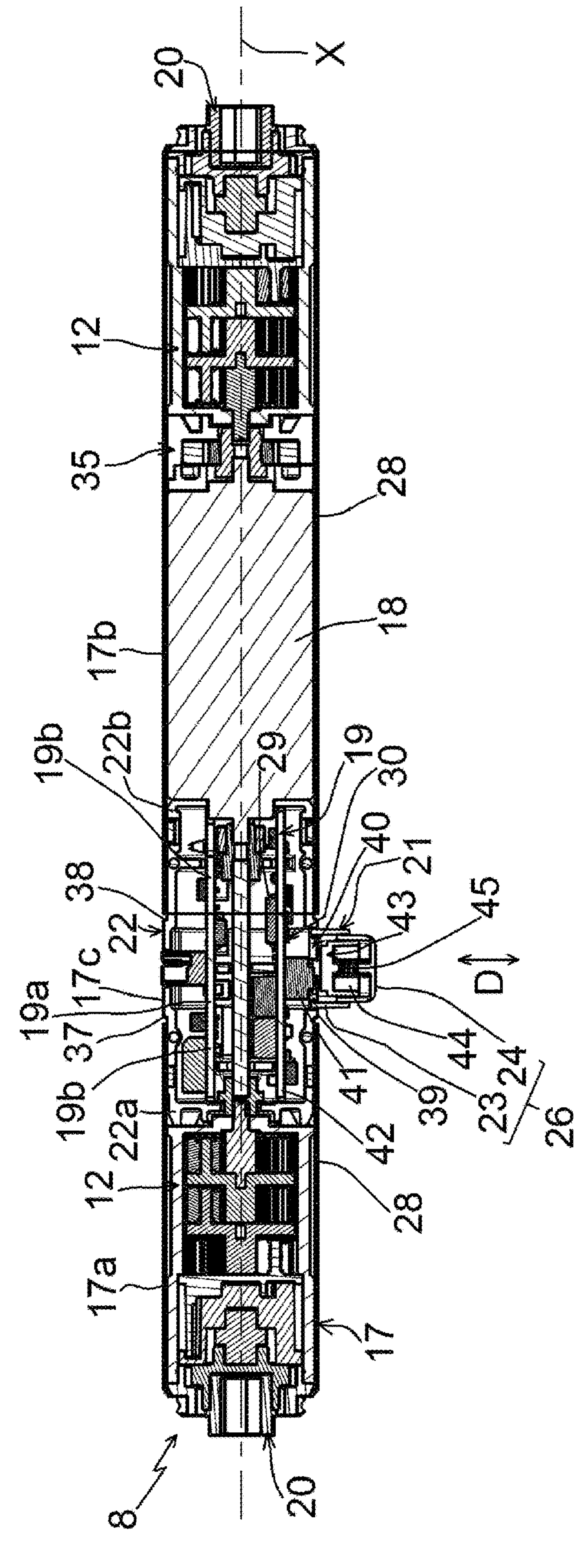
FIG. 3 is an axial sectional view of the electromechanical actuator illustrated in FIG. 2.
Figure 4:
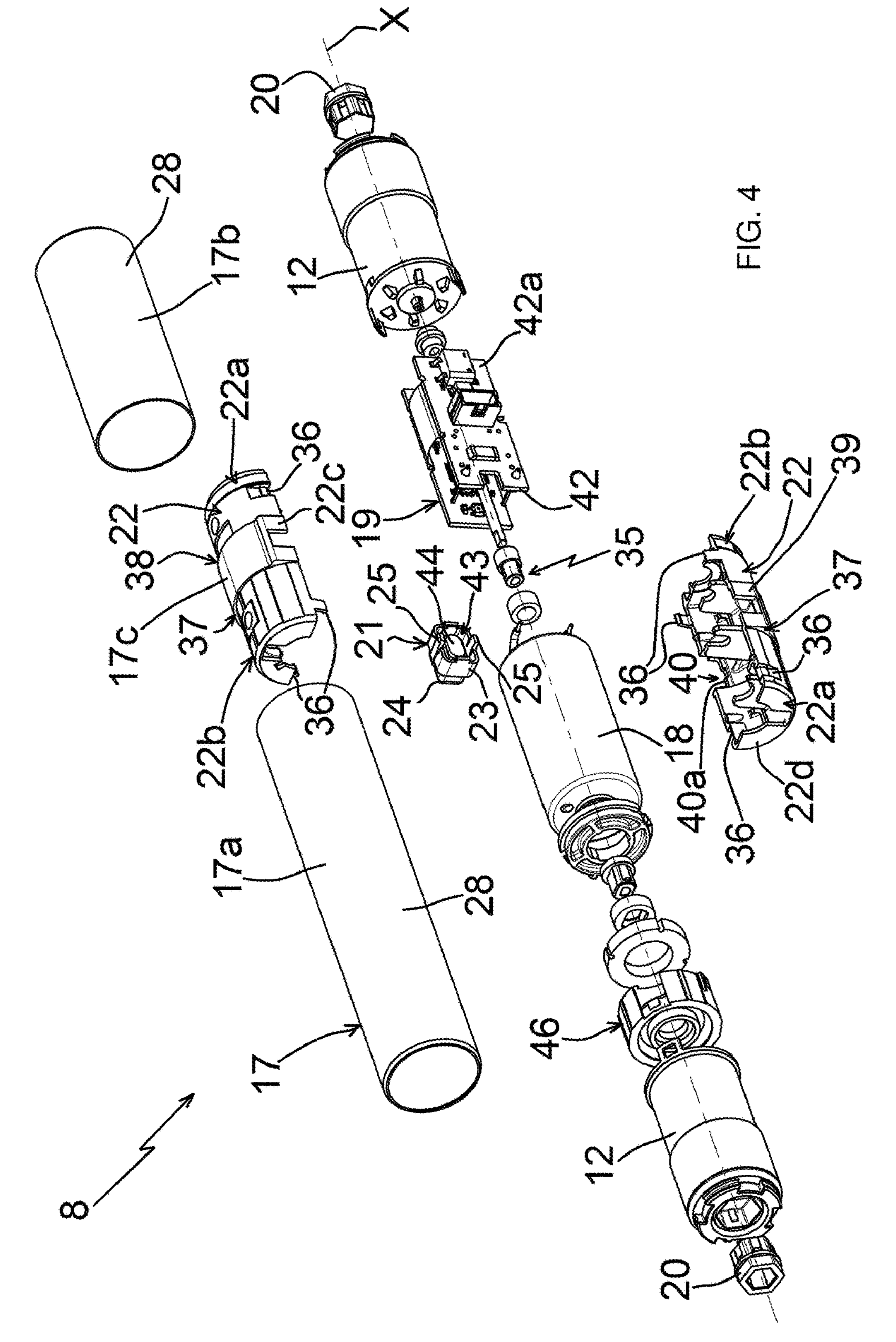
FIG. 4 is an exploded schematic and perspective view of the electromechanical actuator illustrated in FIGS. 2 and 3.
Figure 5:
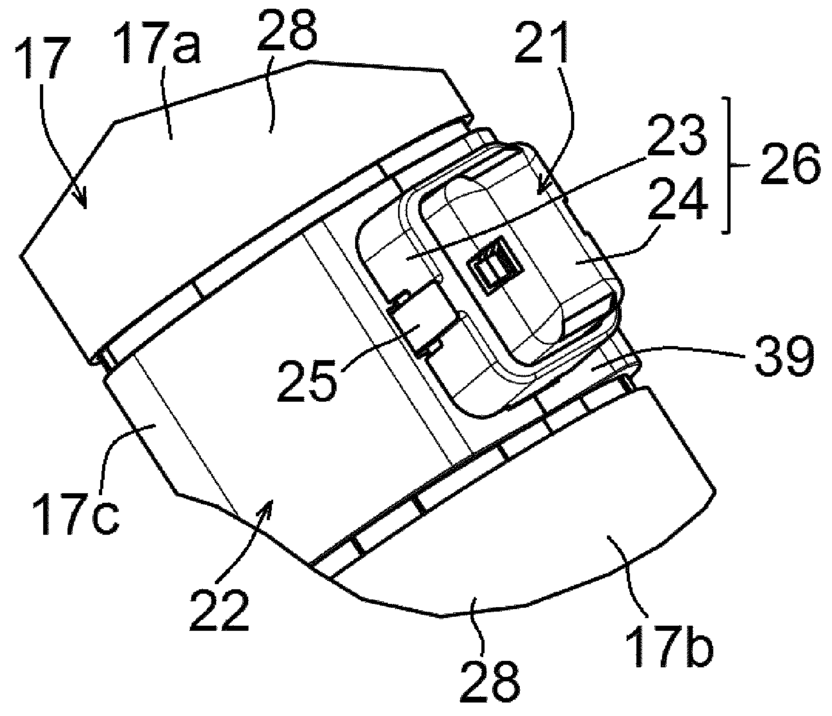
FIG. 5 is a schematic perspective view of a part of the electromechanical actuator illustrated in FIGS. 2 to 4 illustrating a switching device.

The type and number of reduction stages of the reducing gearbox are not limiting. For example, the number of reduction stages can be two or three. Here and as illustrated in FIGS. 3 and 4, the electromechanical actuator 8 comprises two reducing gearboxes 12 and two output shafts 20, so that each output shaft 20 rotates one of the winders. Each output shaft 20 opens to a side of the casing 17 of the electromechanical actuator 8. Each output shaft 20 is connected to a drive shaft 11 of one of the winders by means of attachment elements, not shown. The attachment elements of each output shaft 20 to one of the drive shafts 11 are, for example, screw attachment elements.

Each winder is thus rotated, at one of the tilting devices 13, by one of the drive shafts 11 coupled with one of the output shafts 20 of the electromechanical actuator 8.

Advantageously, the electromechanical actuator 8 also comprises a brake 46, as shown only in FIG. 4.

By way of non-limiting examples, the brake 46 can be a magnetic brake, a spring brake, a cam brake, or an electromagnetic brake.

Advantageously, the electric motor 18 and, eventually, the reducing gearboxes 12 and the brake 46 are arranged inside the casing 17 of the electromechanical actuator 8.

Control means of the electromechanical actuator 8, allowing the movement of the screen 2 of the blind 1 as well as the orientation of the slats 3 of the screen 2, comprise at least the electronic control unit 19. This electronic control unit 19 is suitable for operating the electric motor 18 of the electromechanical actuator 8 and, in particular, for supplying electric power to the electric motor 18.

Thus, the electronic control unit 19 controls, in particular, the electric motor 18, so that the screen 2 is opened or closed, and the slats 3 of screen 2 are oriented, as described above.

Advantageously, the electronic control unit 19 also comprises a communication module, not shown, in particular for receiving command orders, the command orders being emitted by an order transmitter, such as the remote control 16 intended to control the electromechanical actuator 8 or one of the local or central command units 14, 15.

In an exemplary embodiment, the communication module of the electronic control unit 19 is of the wireless type. In particular, the communication module is configured to receive radio command orders.

In a variant, the communication module can allow the reception of commands orders transmitted by wired means.

The central command unit 15, the local command unit 14 or the electronic control unit 19 can also be in communication with a server 27, as illustrated in FIG. 1, so as to control the electromechanical actuator 8 according to data made available remotely via a communication network, in particular an Internet network that can be connected to the server 27.

The control means of the electromechanical actuator 8 comprise hardware and/or software means. By way of a non-limiting example, the hardware means may comprise at least a microcontroller 29, as illustrated in FIG. 3.

The electromechanical actuator 8 also comprises a switching device 21.

In the case of a blind with slats, an upper position, in particular a safety position, corresponds to a bearing of a first slat 3*h* of the screen 2 against an element of the switching device 21.

The first slat 3*h* of the screen 2 corresponds to the upper slat 3 of the screen 2, in the assembled configuration of the blind 1 in the home automation installation.

The switching device 21 allows, in particular, to determine the reaching of the upper position of the screen 2.

An upper end-of-travel position, in particular of operation, corresponds to a predetermined upper end-of-travel position, in particular, by means of an end-of-travel detection device 35.

Moreover, a lower end-of-travel position corresponds to a predetermined lower end-of-travel position, in particular, by means of the end-of-travel detection device 35, or by the bearing of the loading bar 4 against a threshold of the opening of the building, or by fully opening the screen 2.

Here, the end-of-travel detection device 35 can be of magnetic type and assembled on one of the output shafts 20 of the electromechanical actuator 8. Such an end-of-travel detection device 35 comprises at least a wheel and Hall effect sensors.

The type of end-of-travel detection device is not limiting and can be different, in particular of temporal type and realized through the microcontroller of the electronic control unit.

A part of the electromechanical actuator 8 comprising the switching device 21 is now described, in more detail and with reference to FIGS. 2 to 8.

Advantageously, the switching device 21 comprises a housing 22. Here, the housing 22 comprises two half-shells 22*c*, 22*d*, as illustrated in FIG. 4. These two half-shells 22*c*, 22*d* are assembled, in other words configured to be joined together, in an assembled configuration of the electromechanical actuator 8, in particular by means of attachment elements 36, for example by elastic snap-on fastening.

Advantageously, the casing 17 of the electromechanical actuator 8 comprises at least a first part 17*a* and a second part 17*b*. The housing 22 of the switching device 21 is arranged, along the axis of rotation X, between the first part 17*a* of the casing 17 and the second part 17*b* of the casing 17. Thus, the housing 22 of the switching device 21 forms a third part 17*c* of the casing 17.

In an embodiment, the casing 17 is made at least partly of metallic material. The material of the casing of the electromechanical actuator is not limiting and can be different. It can be, in particular, made of a plastic material.

Here, the first and second parts 17*a*, 17*b* of the casing 17 are made of a metallic material. Moreover, the third part 17*c* of the casing 17, formed by the housing 22 of the switching device 21, is made of a plastic material.

Advantageously, the housing 22 of the switching device 21 is attached to the first and second parts 17*a*, 17*b* of the casing 17.

Here and as illustrated in FIGS. 3 and 4, the housing 22 is attached to the first and second parts 17*a*, 17*b* of the casing 17 by push-fitting, in particular by inserting a first part 22*a* of the housing 22 into the first part 17*a* of the casing 17, up to a first shoulder 37 of the housing 22, and by inserting a second part 22*b* of the housing 22 into the second part 17*b* of the casing 17, up to a second shoulder 38 of the housing 22.

The type of attachment of the housing to the first and second parts of the casing is not limiting and can be different. It can be, in particular, be an attachment by screwing or elastic snap-on attachment elements.

Advantageously, the housing 22 of the switching device 21 is tubular. Here, the housing 22 of the switching device 21 is cylindrical in shape and, more particularly, has a circular cross-section. In a variant, not shown, the housing 22 of the switching device 21 is of parallelepipedal shape.

In a variant, not shown, the casing 17 of the electromechanical actuator 8 is made in one part, that is to say is of the monobloc type, and, more particularly, has no housing 22 of the switching device 21. In such a case, the switching device 21 is assembled directly on the casing 17 of the electromechanical actuator 8, in the assembled configuration of the electromechanical actuator 8, that is to say without an intermediate housing.

The casing 17 comprises at least a wall 28, 39. Here, the first and second parts 17*a*, 17*b* of the casing 17 comprise a first wall 28, in particular of circular cross-section. Moreover, the third part 17*c* of the casing 17, formed by housing 22 of the switching device 21, comprises a second wall 39, in particular of circular cross-section in which flat areas are provided.

The wall 39 of the casing 17, in particular of the third part 17*c* of the casing 17, comprises at least an opening 40. Here, the opening 40 is arranged in a flat area of the wall 39 of the third part 17*c* of the casing 17. Advantageously, the opening 40 of the wall 39 of the casing 17 is arranged in a lower part of the casing 17, in an assembled configuration of the electromechanical actuator 8 in the rail 9 of the blind 1.

Thus, the opening 40 of the wall 39 of the casing 17 is arranged opposite to the first 3*h* slat of the blind 1, in the assembled configuration of the electromechanical actuator 8 in the rail 9 of the blind 1.

In a variant, not shown, in the case where the cross section of the casing 17 is square or rectangular, the casing 17 comprises a bottom wall, a top wall, a first side wall and a second side wall. In this case, the opening 40 is made in the bottom wall of the casing 17.

The switching device 21 also comprises a first member 23 and a second member 24. Here, the first member 23 is connected to the casing 17 and, more particularly, to the wall 39 of the casing 17.

The first member 23 is fastened, in other words configured to be fastened, on the wall 39 of the casing 17 by means of removable attachment elements 25, in the assembled configuration of the electromechanical actuator 8. Moreover, the first member 23 is arranged opposite to the opening 40 of the wall 39 of the casing 17, in the assembled configuration of the electromechanical actuator 8.

Advantageously, the removable attachment elements 25 are elastic snap-on attachment elements.

In this exemplary embodiment, each removable attachment element 25 comprises a spring tab arranged on the first member 23 that cooperates, in other words is configured to cooperate, with an edge 40*a* of the opening 40 of the wall 39 of the casing 17, in the assembled configuration of the electromechanical actuator 8, and, more particularly, with an indentation of the opening 40 of the wall 39 of the casing 17.

Here, the first member 23 comprises two spring tabs 25 cooperating, in other words configured to cooperate, respectively with the edge 40*a* of the opening 40 of the wall 39 of the casing 17.

The number and the type of removable attachment elements of the first member on the wall of the casing are not limiting and can be different. The number of removable attachment elements of the first member on the wall of the casing can be more than two. Moreover, the removable attachment elements can be screwing attachment elements.

The second member 24 is movable relative to the first member 23, in the assembled configuration of the electromechanical actuator 8.

Advantageously, the second member 24 is movable relative to the first member 23 according to a translational movement D, as illustrated in FIG. 3.

In the exemplary embodiment illustrated in FIGS. 3 and 4, the first member 23 comprises an accommodation 43, inside which the second member 24 is partially arranged. Moreover, the first member 23 comprises a barrel 44 arranged in the center of the accommodation 43 and configured to cooperate with a hole, not shown, in the second member 24.

Here, during the translational movement of the second member 24 relative to the first member 23, the second member 24 is guided inside the accommodation 43 of the first member 23 by the complementary shape of the first and second members 23, 24, in particular by the contour of the second member 24 and the contour of the accommodation 43 of the first member 23. Moreover, the second member 24 is centered with respect to the first member 23 by means of the barrel 44 of the first member 23 sliding inside the hole arranged in the second member 24. Furthermore, the second member 24 may comprise a central pin configured to slide within a central bore of the barrel 44 of the first member 23.

Advantageously, the first member 23 and the second member 24 form a sub-assembly 26 of the switching device 21. The sub-assembly 26 of the switching device 21 is arranged outside the casing 17 and, more particularly, the housing 22. Such a sub-assembly 26 of the switching device 21 is generally called "mushroom".

In practice, in the assembled configuration of the blind 1 in the home automation installation, the second member 24 of the switching device 21 is moved, in other words configured to be moved, by the first slat 3*h* of the screen 2, relative to the first member 23, when the screen 2 reaches the upper position.

Thus, the movement of the second member 24 relative to the first member 23, in a direction of approach of the second member 24 relative to the casing 17, results from a movement of the first slat 3*h* of the screen 2 towards the upper position, when the electromechanical actuator 8 is activated. The movement of the first slat 3*h* of the screen 2 is carried out by activating the electromechanical actuator 8 and winding the drive cords 5 around the winders.

This movement of the second member 24 of the switching device 21 relative to the first member 23 by means of the first slat 3*h* of the screen 2 corresponds to the reaching of the upper position of the screen 2.

In this way, when this movement of the second member 24 has been detected, the electronic control unit 19 controls the stopping of the electric motor 18 of the electromechanical actuator 8.

Advantageously, at least a part of the switching device 21 is arranged outside the rail 9. The part of the switching device 21 arranged outside the rail 9 corresponds to at least a part of the sub-assembly 26 of the switching device 21.

Here, another part of the switching device 21 is arranged inside the rail 9, in particular the casing 17, as well as the parts assembled inside it.

In the assembly mode illustrated in FIG. 1, the second member 24 of the switching device 21 extends underneath the bottom wall 9*a* of the rail 9, in the assembled configuration of the blind 1 in the home automation installation. In this case, the sub-assembly 26 or mushroom of the switching device 21 passes through an opening, not shown, arranged in the bottom wall 9*a* of the rail 9.

Advantageously, in the assembled configuration of the blind 1 in the home automation installation, the second member 24 of the switching device 21 is moved, in other words configured to be moved, between a first position, so-called rest position, in which no contact is made between the second member 24 and the first slat 3*h* of the screen 2, and a second position, so-called upper detection position of the screen 2, in which the first slat 3*h* of the screen 2 is in contact with the second member 24.

Advantageously, the switching device 21 comprises an elastic return element 45 of the second member 24 relative to the first member 23, so as to maintain the second member 24 in a rest position, in the assembled configuration of the electromechanical actuator 8, in particular as long as the first slat 3*h* of the screen 2 is not in contact with the second member 24.

Thus, when the first slat 3*h* of the screen 2 is in a position different from the upper position of the screen 2, the elastic return element 45 holds or returns, in other words is configured to hold or return, the second member 24 in its rest position. Here, the elastic return element 45 exerts, on the second member 24, a force radial to the axis of rotation X, directed downwards in FIG. 3 and parallel to the translational movement D.

Advantageously, the elastic return element 45 is a spring, for example, in the form of a spiral.

In a variant, not shown, the second member 24 is configured to return to the rest position relative to the first member 23 by gravity, in the assembled configuration of the blind 1 in the home automation installation. In other words, the second member 24 is configured to move from its second position to its first position relative to the first member 23, under effect its own weight.

Advantageously, the second member 24 comprises stops, not shown, cooperating, in other words configured to cooperate, with stops of the first member 23, in the assembled configuration of the electromechanical actuator 8, when the second member 24 is in the rest position relative to the first member 23.

Thus, the cooperation of the stops of the second member 24 with the stops of the first member 23 makes it possible to limit a displacement stroke of the second member 24 with respect to the first member 23.

Here, in the assembled configuration of the electromechanical actuator 8, the stops of the second member 24 cooperate, in other words are configured to cooperate, with the stops of the first member 23, when the second member 24 is held in the rest position relative to the first member 23, by means of the elastic return element 45.

Thus, the cooperation of the stops of the second member 24 with the stops of the first member 23 allows to ensure that the second member 24 is held in position relative to the first member 23, under the effect of elastic return of the elastic return element 45.

Here, each of the first and second members 23, 24 comprises two stops.

The number of stops for each of the first and second members is not limiting and can be different. It may, for example, be greater than or equal to three.

The electronic control unit 19 comprises at least a switch 41 and a printed circuit board 42. In practice, the switch 41 allows to detect the upper position of the screen 2 of the blind 1.

Here, the electronic control unit 19 comprises a single switch 41 for detecting the upper position of the screen 2 of the blind 1.

Here, the switch 41 is of the electromechanical type.

Advantageously, the switch 41 is electrically connected to the printed circuit board 42 by electrical conductors.

The switch 41 is activated, in other words configured to be activated, via the second member 24 of the switching device 21 through the opening 40 arranged in the wall 39 of the casing 17, depending on a position of the second member 24 relative to the first member 23, in the assembled configuration of the electromechanical actuator 8.

The switch 41 is assembled, in other words configured to be assembled, on the printed circuit board 42, in the assembled configuration of the electromechanical actuator 8.

Advantageously, the electronic control unit 19 comprises the microcontroller 29. The microcontroller 29 is assembled on the printed circuit board 42, in the assembled configuration of the electromechanical actuator 8. Moreover, the microcontroller 29 comprises a memory, not shown.

Advantageously, the electronic control unit 19 comprises at least a first part 19*a* and a second part 19*b*. The first part 19*a* of the electronic control unit 19 is arranged inside a part 17*c* of the casing 17 of the electromechanical actuator 8, in the assembled configuration of the electromechanical actuator 8. Moreover, the second part 19*b* of the electronic control unit 19 is arranged inside another part 17*a*, 17*b* of the casing 17 of the electromechanical actuator 8, in the assembled configuration of the electromechanical actuator 8.

Here and as shown in FIG. 3, in the assembled configuration of the electromechanical actuator 8, the first part 19*a* of the electronic control unit 19 is arranged inside the third part 17*c* of the casing 17 and the second part 19*b* of the electronic control unit 19 is arranged inside the first and second parts 17*a*, 17*b* of the casing 17. Furthermore, the second part 19*b* of the electronic control unit 19 is bipartite and arranged on either side of the first part 19*a* of the electronic control unit 19.

Advantageously, the electronic control unit 19 is arranged inside the housing 22 of the switching device 21.

The printed circuit board 42 comprises an electrical connection device 30 arranged opposite to the opening 40 of the wall 39 of the casing 17, in the assembled configuration of the electromechanical actuator 8. Moreover, the electrical connection device 30 is accessible through the opening 40 of the wall 39 of the casing 17, following a removal of the first and second members 23, 24 from the wall 39 of the casing 17, by disassembling of the removable attachment elements 25, in particular from the wall 39 of the casing 17.

Here, the removal of the first and second members 23, 24 from the wall 39 of the casing 17 is carried out by means of the removable attachment elements 25 which are disassembled, in other words separated from the wall 39 of the casing 17. "Disassemble" means that the removable attachment elements 25 are rendered inactive to allow the first and second members 23, 24 to be separated from the wall 39 of the casing 17.

In the case where the removable attachment elements 25 are snap-on attachment elements, the removal of the first and second members 23, 24 relative to the wall 39 of the casing 17 is carried out by applying pressure to the removable attachment elements 25, so that the removable attachment elements 25 are released from the wall 39 of the casing 17.

Thus, such a construction of the electromechanical actuator 8 allows easy access to the electrical connection device 30, during maintenance or repair intervention on the electromechanical actuator 8, without having to disassemble the electromechanical actuator 8 relative to the blind 1.

Moreover, the electromechanical actuator 8 allows, on the one hand, the detection of an upper position of the screen 2 of the blind 1 by means of the switching device 21 and the electronic control unit 19 and, on the other hand, provides access to the electrical connection device 30 of the printed circuit board 42 through the opening 40 arranged in the casing 17, following the disassembling of the first and second members 23, 24 of the switching device 21 relative to the casing 17.

In this way, the electromechanical actuator 8 comprises a limited number of components to, on the one hand, enable the detection of the upper position of the screen 2 and, on the other hand, to allow access to the electrical connection device 30 of the printed circuit board 42.

Consequently, the costs of obtaining the electromechanical actuator 8 are low.

Furthermore, the positioning of the opening 40 of the wall 39 of the casing 17 in the lower part of the casing 17, in the assembled configuration of the electromechanical actuator 8 in the rail 9 of the blind 1, allows easy access to the electrical connection device 30 from below, during maintenance or repair intervention on the electromechanical actuator 8, without having to disassemble the electromechanical actuator 8 relative to the blind 1. The positioning of the opening 40 of the wall 39 of the casing 17 in the lower part of the casing 17, in the assembled configuration of the electromechanical actuator 8 in the rail 9 of the blind 1, also allows to facilitate the visualization of the electrical connection device 30, following the disassembly of the first and second members 23, 24 of the switching device 21 relative to the casing 17.

Advantageously, the electrical connection device 30 of the printed circuit board 42 is configured to reset or adjust at least some of the operating parameters of the electromechanical actuator 8, by means of a terminal 14, 16, 32. The operating parameters are stored in the memory of the electronic control unit 19.

Here, the operating parameters can be, for example, a speed of movement of the screen 2 or the upper or lower end-of-travel position of the screen 2.

Advantageously, the electrical connection device 30 of the electromechanical actuator 8 is electrically connected, in other words is configured to be electrically connected, with an electrical plug 33, following the removal of the switching device 21 from the casing 17.

The terminal 14, 16, 32 can be, for example, a configuration tool 32, the local command unit 14 or the remote control 16. The terminal 14, 16, 32 can also be a smart phone, a tablet, or a computer. Advantageously, the terminal 14, 16, 32 is connected to the electrical plug 33 by means of a communication link L, represented by a dotted axis line in FIGS. 7 and 8.

Thus, the electrical plug 33 is configured to communicate with the terminal 14, 16, 32 by means of the communication link L, following the electrical connection of the electrical plug 33 with the electrical connection device 30 of the electromechanical actuator 8. Advantageously, the communication link L between the electrical plug 33 and the terminal 14, 16, 32 can be carried out in a wired way.

In a variant, the communication link L between the electrical plug 33 and the terminal 14, 16, 32 can be carried out wirelessly, in other words by exchanging radio or optical signals.

In the case where the communication link between the electrical plug 33 and the terminal 14, 16, 32 is carried out by exchanging radio signals, the electrical plug 33 and the terminal 14, 16, 32 each comprise respectively a communication module for transmitting and/or receiving radio signals. The exchange of radio signals can be carried out according to a communication protocol, which can be, for example, Wi-Fi, Bluetooth or proprietary.

Advantageously, the electrical plug 33 can comprise a memory, not shown, and can be configured to update at least a part of a software stored in the memory of the electronic control unit 19 of the electromechanical actuator 8, following the electrical connection of the electrical plug 33 with the electrical connection device 30 of the electromechanical actuator 8. Moreover, the electrical plug 33 is configured to be connected to the terminal 14, 16, 32, in particular by means of a communication port, which can be, for example, a USB type (Universal Serial Bus), so that at least a part of the software to be updated is stored in the memory of the electronic control unit 19 of the electromechanical actuator 8.

Thus, the electrical plug 33 can be used as a key on which is stored data to be updated in the software stored in the memory of the electronic control unit 19 of the electromechanical actuator 8, following the recording of these data from terminal 14, 16, 32.

Advantageously, the electrical connection device 30 of the printed circuit board 42 is configured to allow a diagnosis of the electromechanical actuator 8, from the operating data of the electromechanical actuator 8, by means of the terminal 14, 16, 32. The operating data are stored in the memory of the electronic control unit 19.

Here the operating data can be, for example, a temperature of the electromechanical actuator 8, which can be measured by a temperature sensor, not shown, a number of operating cycles of the electromechanical actuator 8 over a predetermined period of time or a consumption of current over a predetermined period of time. Advantageously, the electrical connection device 30 comprises electrical connection points 31 on a side 42*a* of the printed circuit board 42.

Advantageously, the electrical connection points 31 are electrical conductors of the printed circuit board 42.

Here, the electrical conductors of the printed circuit board 42 correspond to electrical tracks printed on the printed circuit board 42.

Figure 6:
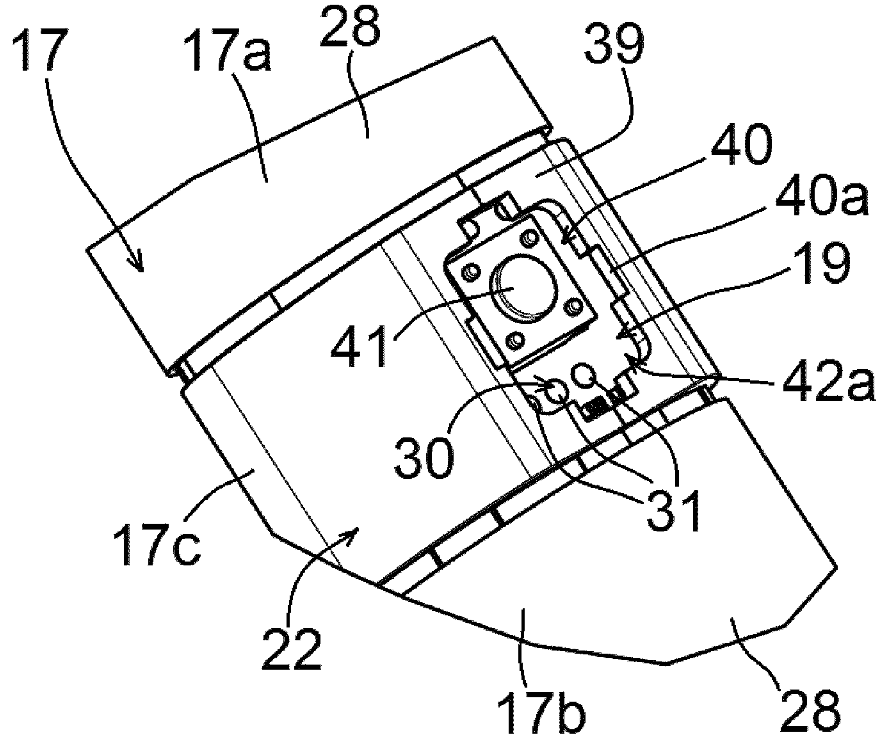
FIG. 6 is a view similar to FIG. 5, where first and second members of the switching device are omitted.
Figure 7:
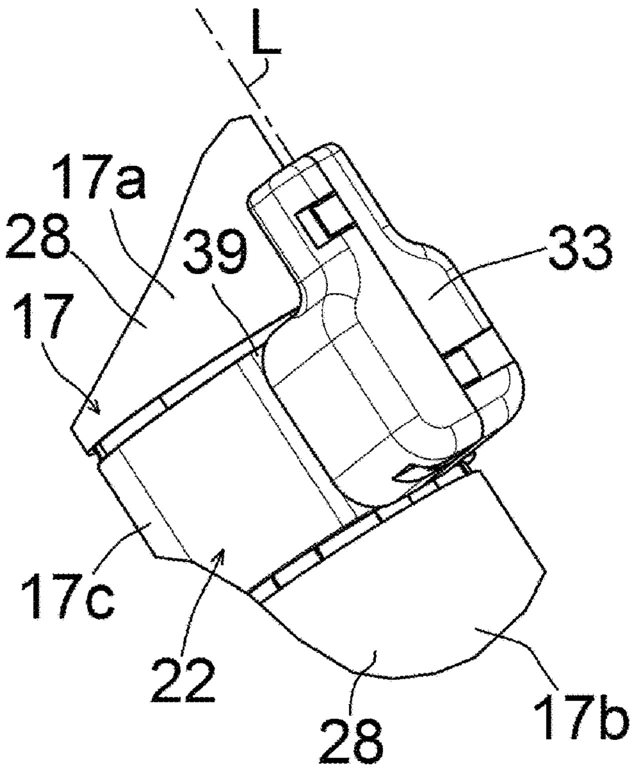
FIG. 7 is a view similar to FIGS. 5 and 6, where an electrical plug is assembled on the electromechanical actuator in place of the first and second members of the switching device.

Here, the electrical connection device 30 comprises four electrical connection points 31. In FIG. 6, only three of the electrical connection points 31 are shown.

The number of electrical connection points is not limiting and can be different. It can be, in particular, two, three or more than or equal to five.

In practice, the electrical plug 33 of the terminal 14, 16, 32 has pins that cooperate, in other words are configured to cooperate, with the electrical connection device 30 and, more particularly, with the electrical connection points 31 of the printed circuit board 42.

Advantageously, the electrical connection points 31 of the printed circuit board 42 are electrically connected to ports of the microcontroller 29 of the electronic control unit 19 by electrical tracks, not shown, printed on the printed circuit board 42.

In a variant, not shown, the electrical connection device 30 comprises an electrical connector. In such a case, the electrical connector is attached to the printed circuit board 42 and, more particularly, soldered to the printed circuit board 42. Moreover, the electrical plug 33 is equipped with an electrical connector that is complementary to that of the electrical connection device 30.

Here, the home automation installation comprises the blind 1, in other words the electromechanical actuator 8, as well as the electrical plug 33 and the terminal 14, 16, 32.

Figure 8:
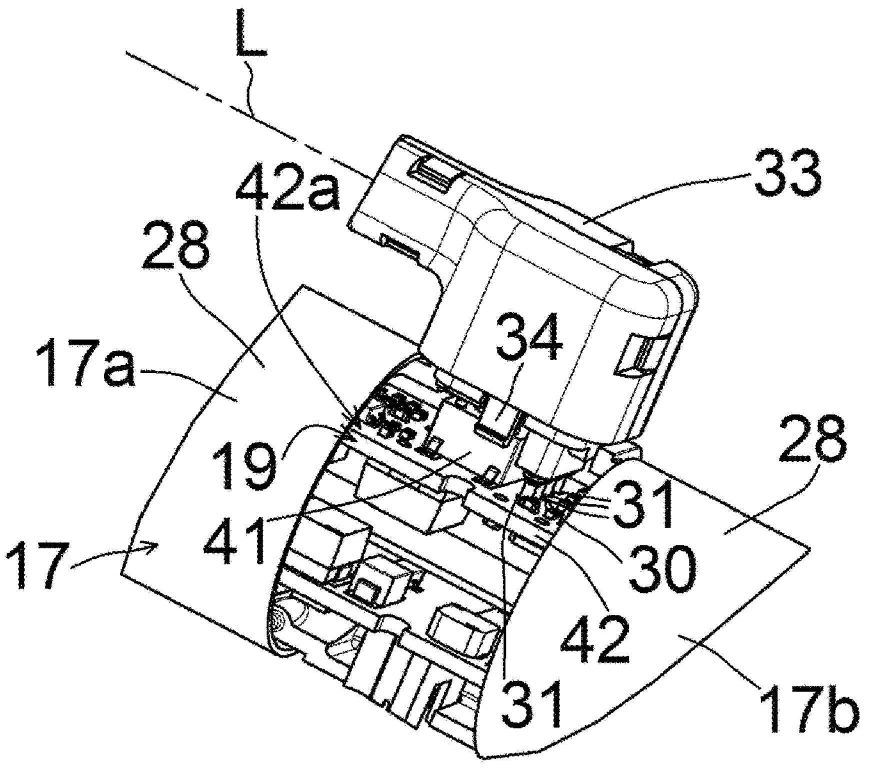
FIG. 8 is a view similar to FIG. 7, where a housing of the switching device is omitted.

Advantageously, the electrical plug 33 comprises removable attachment elements 34, only one of which is shown in FIG. 8. The removable attachment elements 34 of the electrical plug 33 are configured to cooperate with the wall 39 of the casing 17, in an assembled configuration of the electrical plug 33 with the electromechanical actuator 8.

In practice, the removable attachment elements 34 of the electrical plug 33 are similar to the removable attachment elements 25 of the first member 23 of the switching device 21.

Thanks to the present invention, such a construction of the electromechanical actuator makes it possible to facilitate access to the electrical connection device, during maintenance or repair intervention on the electromechanical actuator, without having to disassemble the electromechanical actuator relative to the covering device.

Moreover, the electromechanical actuator makes it possible, on the one hand, to detect an upper position of a screen of the covering device by means of the switching device and the electronic control unit and, on the other hand, to gain access to the electrical connection device of the printed circuit board through the opening arranged in the casing of the electromechanical actuator, following the disassembly of the first and second members of the switching device relative to the casing.

Of course, many modifications can be made to the examples described above without going beyond the scope of the invention defined by the claims.

In another exemplary embodiment, not shown, the motorized drive unit 7 comprises a plurality of first winders of the drive cords 5 and a plurality of second winders of the orientation cords 6. In this case, the drive cords 5 are connected to the loading bar 4, on the one hand, and to the first winders, on the other hand. The orientation cords 6 are connected to the loading bar 4, to the slats 3, and to the second winders. In practice, the lower end of each drive cord 5 is connected to the loading bar 4 and the upper end of each drive cord 5 is connected to one of the first winders, in the assembled configuration of the blind 1 in the home automation installation. The lower end of each orientation cord 6 is connected to the loading bar 4 and the upper end of each orientation cord 6 is connected to one of the second winders, in the assembled configuration of the blind 1 in the home automation installation. Preferably, the first and second winders are arranged inside the rail 9.

In another exemplary embodiment, not shown, the motorized drive unit 7 comprises two drive and orientation chains for the slats 3 of screen 2, replacing the drive cords 5 and the orientation cords 6. In such a case, each chain is arranged inside one of the guides arranged along a side of screen 2 of the blind 1.

Moreover, the envisaged embodiments and variants can be combined to generate new embodiments of the invention, without going beyond the scope of the invention defined by the claims.

The invention claimed is:

1. An electromechanical actuator of a covering device, the electromechanical actuator comprising:

a casing comprising a wall comprising at least an opening;

an electric motor;

a switching device comprising:

a first member attached on the wall of the casing by removable attachment elements and configured opposite to the opening of the wall of the casing, in an assembled configuration of the electromechanical actuator, and a second member movable relative to the first member, in the assembled configuration of the electromechanical actuator; and an electronic control unit comprising:

a switch configured to be activated via the second member of the switching device through the opening arranged in the wall of the casing, depending on a position of the second member relative to the first member, in the assembled configuration of the electromechanical actuator, and a printed circuit board, the switch being assembled on the printed circuit board, in the assembled configuration of the electromechanical actuator, the printed circuit board comprising an electrical connection device disposed opposite to the opening of the wall of the casing, in the assembled configuration of the electromechanical actuator, the electrical connection device being accessible through the opening of the wall of the casing, following a removal of the first and second members from the wall of the casing, by disassembly of the removable attachment elements, wherein the electromechanical actuator is configured to:

detect an upper position of a screen of the covering device by the switching device and the electronic control unit, and allow access to the electrical connection device of the printed circuit board through the opening in the casing of the electromechanical actuator, following disassembly of the first and second members of the switching device from the casing.

2. The electromechanical actuator of the covering device according to claim 1, wherein the electrical connection device of the printed circuit board is configured to reset or adjust at least some operating parameters of the electromechanical actuator, by a terminal, the operating parameters being stored by a memory of the electronic control unit.

3. The electromechanical actuator of the covering device according to claim 2, wherein the electronic control unit comprises a microcontroller assembled on the printed circuit board, in the assembled configuration of the electromechanical actuator, the microcontroller comprising the memory.

4. The electromechanical actuator of the covering device according to claim 3, wherein the casing of the electromechanical actuator is tubular.

5. The electromechanical actuator of the covering device according to claim 3, wherein the removable attachment elements are elastic snap-on attachment elements.

6. The electromechanical actuator of the covering device according to claim 2, wherein the electrical connection device of the printed circuit board is configured to enable a diagnosis of the electromechanical actuator, from operating data of the electromechanical actuator, by a terminal, the operating data being stored by a memory of the electronic control unit.

7. The electromechanical actuator of the covering device according to claim 2, wherein the casing of the electromechanical actuator is tubular.

8. The electromechanical actuator of the covering device according to claim 2, wherein the removable attachment elements are elastic snap-on attachment elements.

9. The electromechanical actuator of the covering device according to claim 2, wherein the electrical connection device comprises electrical connection points arranged on a face of the printed circuit board.

10. The electromechanical actuator of the covering device according to claim 1, wherein the electrical connection device of the printed circuit board is configured to enable a diagnosis of the electromechanical actuator, from operating data of the electromechanical actuator, by a terminal, the operating data being stored by a memory of the electronic control unit.

11. The electromechanical actuator of the covering device according to claim 10, wherein the electronic control unit comprises a microcontroller assembled on the printed circuit board, in the assembled configuration of the electromechanical actuator, the microcontroller comprising the memory.

12. The electromechanical actuator of the covering device according to claim 10, wherein the casing of the electromechanical actuator is tubular.

13. The electromechanical actuator of the covering device according to claim 10, wherein the removable attachment elements are elastic snap-on attachment elements.

14. The electromechanical actuator of the covering device according to claim 1, wherein the casing of the electromechanical actuator is tubular.

15. The electromechanical actuator of the covering device according to claim 14, wherein the removable attachment elements are elastic snap-on attachment elements.

16. The electromechanical actuator of the covering device according to claim 1, wherein the removable attachment elements are elastic snap-on attachment elements.

17. The electromechanical actuator of the covering device according to claim 1, wherein the electrical connection device comprises electrical connection points arranged on a face of the printed circuit board.

18. The electromechanical actuator of the covering device according to claim 17, wherein the electrical connection points are electrical conductors of the printed circuit board.

19. The electromechanical actuator of the covering device according to claim 1, wherein the electrical connection device is configured to be electrically connected to an electrical plug, following the removal of the switching device relative to the casing.

20. A covering device comprising:

a rail; and the screen configured to be moved by the electromechanical actuator according to claim 1, the electromechanical actuator being disposed inside the rail.

* * * * *